United States Patent

Schopp

[11] 3,711,001
[45] Jan. 16, 1973

[54] WEB POSITION DETECTOR USING TEMPERATURE SENSING ELEMENTS

[75] Inventor: James Conrad Schopp, Framingham, Mass.

[73] Assignee: RCA Corporation

[22] Filed: Nov. 8, 1971

[21] Appl. No.: 196,612

[52] U.S. Cl. ........................226/19, 226/22, 226/45
[51] Int. Cl. .............................................B65h 25/26
[58] Field of Search.................226/22, 15, 18, 19, 45

[56] References Cited

UNITED STATES PATENTS 2,814,487  11/1957  Medkeff.........................226/15 UX
3,175,813  3/1965  Costakis............................226/22 X Primary Examiner—Richard A. Schacher
Attorney—H. Christoffersen

[57] ABSTRACT

Two temperature sensing elements, each having a parameter which varies with the temperature of the element, are cooled by a blower. When a movable web blocks the flow of air to one of the temperature sensing elements causing its temperature to rise, the resulting change in its temperature sensitive parameter relative to that of the other temperature sensing element, controls the movement of the web away from the blocking position.

12 Claims, 5 Drawing Figures

PATENTED JAN 16 1973

WEB POSITION DETECTOR USING TEMPERATURE SENSING ELEMENTS

BACKGROUND OF THE INVENTION

There are many applications requiring the positioning of a moving web relative to a reference surface. The web, as it is wound from one spool to another, may have a tendency to move laterally along the spools (i.e., to move in the direction of the spool axes). If this lateral movement is detected, it may be easily corrected by any of a number of well-known mechanisms. However, the various means suggested for detecting such movement have weaknesses. For example, an arm arranged to contact the web and attached to a miniature switch sometimes mistakes stretching of the web for lateral movement of the web. Air utilized in conjunction with a pressure switch to detect movement away from a pressure port suffers from the same deficiency. This problem may be avoided by employing constraining devices to hold the web against the pressure detecting mechanism; however, then another problem remains. When the web wears, it sometimes permits air to pass through the web to the pressure switch giving the appearance that the web has moved. A light and photocell web detection arrangement also exhibits the lastmentioned disadvantage.

SUMMARY OF THE INVENTION

An apparatus for controlling the position of an object includes first and second temperature sensing devices and means for directing cooling air at them. When the object is moved between the first temperature sensing device and the cooling means responsive to the change in temperature of the first device relative to the second moves the object away from the space between sources of cooling means and the first temperature sensing device.

DETAILED DESCRIPTION

Figure 1:
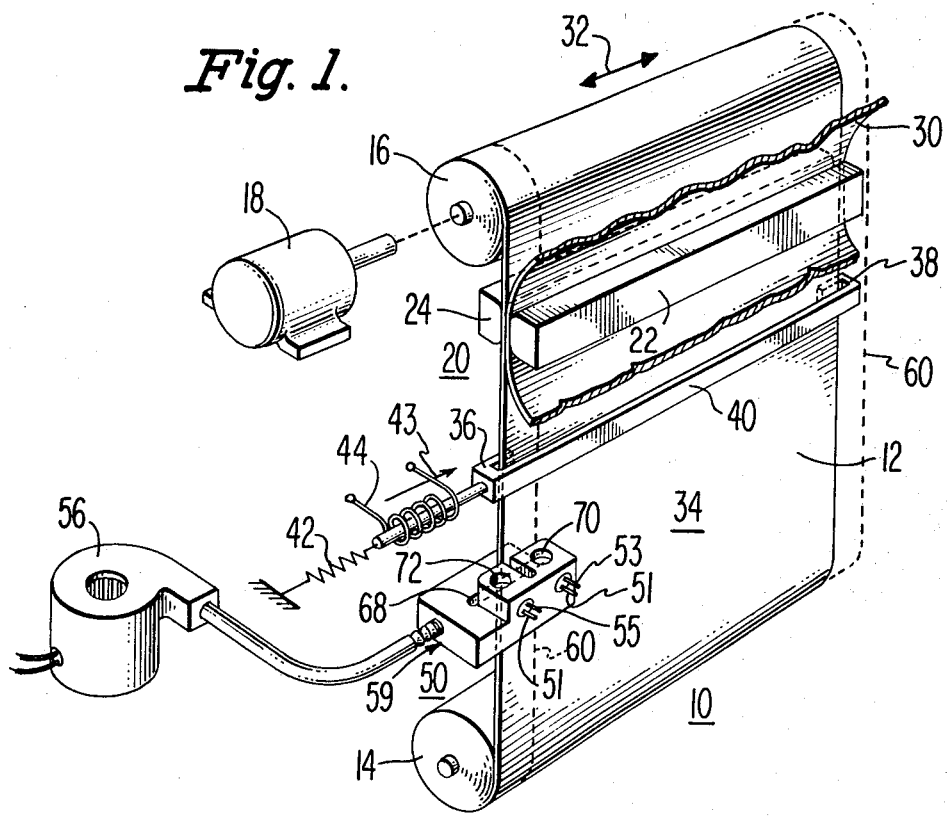
FIG. 1 is a mechanical schematic diagram of a printing apparatus employing the present invention.

FIG. 1 shows schematically a high-speed printer 10 employing a web 12 such as a printing ribbon. The latter is driven from a payout spool 14 to take-up spool 16 by a suitable driving means such as motor 18. Also the motor may be adapted to drive the ribbon from spool 16 to spool 14. The ribbon passes through a print station 20 comprising a set of printing elements 22 and a set of drive hammers 24. The print elements, for example, may be of the conventional chain, train or drum type. The hammer mechanism may be conventionally actuated solenoids driven by suitable electronics. A recording medium 30, only a portion of which is shown, also passes adjacent to ribbon 12 and between printing elements 22 and hammer elements 24. The driving elements (not shown) for the recording medium may be of any conventional design.

When the ribbon 12 is being driven, it may have a tendency to move laterally in the direction of arrows 32. A ribbon skew control mechanism 34, comprising yoke portions 36 and 38 on either edge of the ribbon and a connecting link 40 connecting these two yokes, may be driven in the direction of arrows 32 to counteract this tendency.

The skew control mechanism may be held in its leftward position, as illustrated in FIG. 1, by a spring 42, and driven under electrical control in the opposite direction indicated by arrow 43 by a solenoid 44.

A position detection assembly 50 comprises a temperature sensing assembly 59 and a cooling means such as a blower 56 which conducts a cooling substance such as air to the opposite side of the web. Temperature sensing assembly 59 contains a first thermistor $T_1$ and a reference second thermistor $T_2$ (shown most clearly in FIGS. 2 & 3) which, as illustrated, may both be located on the same side of web 12. The thermistors are part of temperature sensing means which are described more fully in connection with FIG. 5. Thermistor $T_2$ is positioned so that it is always in the path of the cooling air discharged from blower 56. Thermistor $T_1$ is positioned such that it will be in the path of the cooling air when the ribbon 12 is in the position shown by dotted lines 60 in FIG. 1 but will be blocked by the ribbon when it is in the position shown by solid lines in FIG. 1.

The term cooling air is only relative. The temperature inside the printer is elevated relative to the environment in which the printer is located since the printer contains many motors, solenoids and electronics (not shown) which dissipate much electrical heat and also parts such as 22 and 24 moved by the motors dissipate frictional heat. All act as means of heating the thermistors. By contrast, blower 56 may be adapted to pull in relatively cooler air from outside the printer and direct it to assembly 59 which is inside the printer. Additionally, as will be described more fully later, current passing through the thermistors may be a second means to heat the thermistors. Alternatively, the "cooling air" may in fact be any fluid suitable to the application and may in fact be hotter than the ambient temperature of thermistors $T_1$ and $T_2$.

Figure 2:
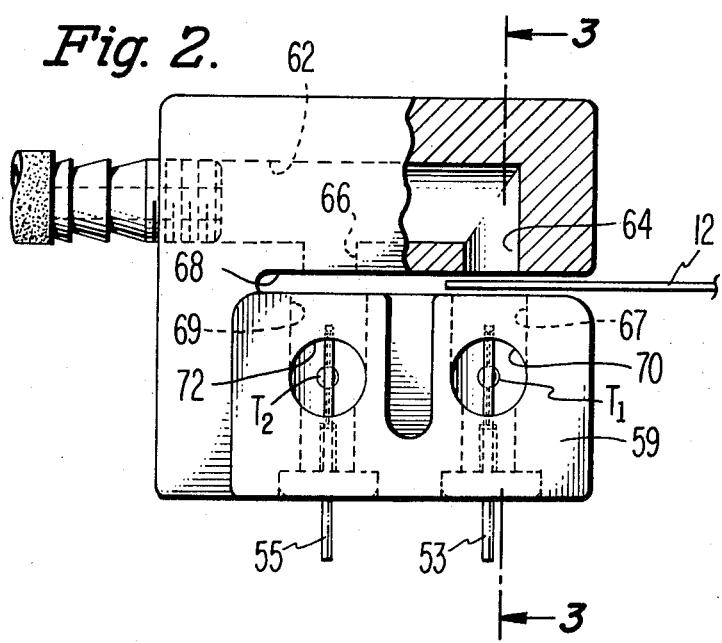
FIG. 2 is a plan view, partially broken away, of a temperature sensing assembly employed in the invention.
Figure 3:
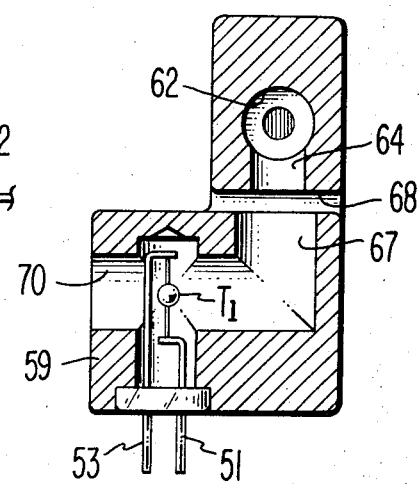
FIG. 3 is a section along lines 3—3 of FIG. 2.
Figure 4:
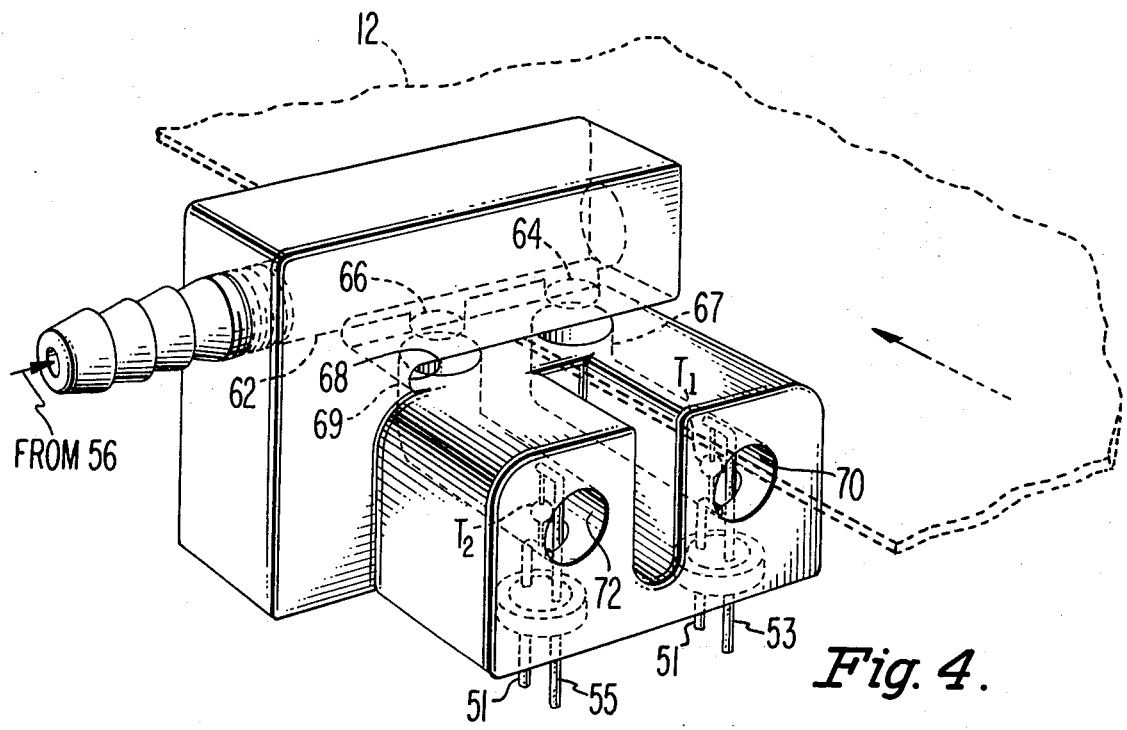
FIG. 4 is a perspective view of the assembly of FIG. 2.

In FIGS. 2, 3 and 4 which illustrate the temperature sensing assembly 59 in greater detail, air from blower 56 (FIG. 1) enters a plenum 62 and exits from orifices 64 and 66. The air then passes through slot 68, into which the web 12 is inserted. If the web is not blocking the air, the air exiting from orifices 64 and 66, enters passages 67 and 69, makes right angle turns, passes over thermistors $T_1$ and $T_2$ and finally exits from ports 70 and 72. If the web is not blocking opening 64, both thermistors $T_1$ and $T_2$ are cooled substantially equally. If the web is blocking opening 64 as illustrated in FIG. 2, then only thermistor $T_2$ is cooled.

Figure 5:
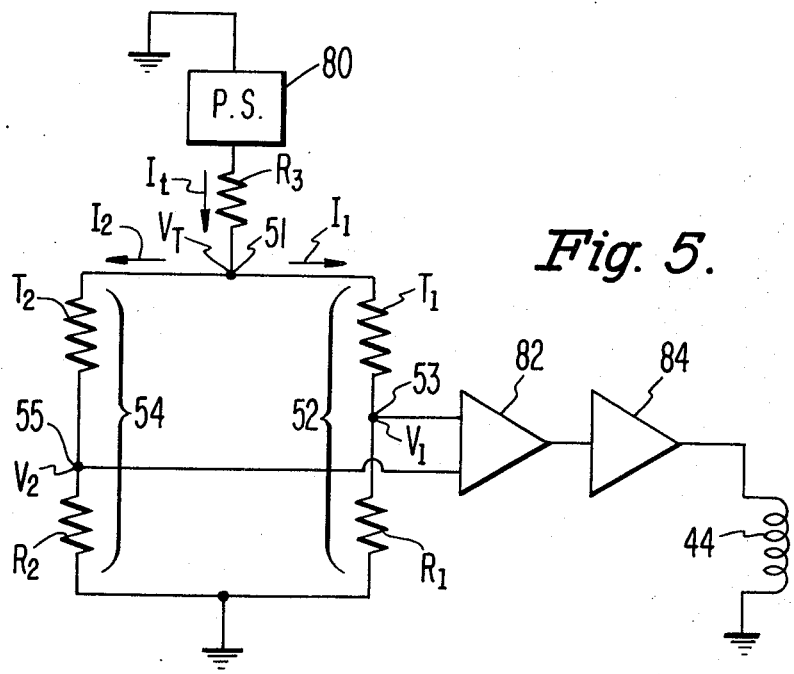
FIG. 5 is a schematic diagram of a circuit which may be employed in the present invention.

In FIG. 5, first temperature sensing means 52 is shown to comprise the first thermistor $T_1$ series connected to a first resistor $R_1$. The second temperature sensing means comprises the second thermistor $T_2$ series connected to a second resistor $R_2$. These four elements are connected as a bridge between node 51 and a point of reference potential such as ground. A source of direct voltage 80 is connected at one terminal through resistor $R_3$ to one node 51 of the bridge and is connected at its other terminal to ground. The values of $R_1$, $R_2$ and $R_3$ may be chosen so that the current through each of the thermistors is either more or less than the amount required to place the thermistors in the self-heat region.

A thermistor may be operated either in the self-heat region or in the nonself-heat region at any given ambient temperature. A thermistor is in the self-heat region when its temperature is detectably above that of its surroundings. In the nonself-heat region, the voltage across the thermistor is directly proportional to the current through it since the temperature and therefore resistance do not vary. By contrast, in the self-heat region the current causes the thermistor to become hotter (self-heating) lowering its resistance which at a given voltage causes it to become even hotter. At some maximum value of temperature this self-heating effect will reach a steady state condition limited by the amount of power available in the circuit or by the voltage drop across the fixed resistor ($R_1$ or $R_2$) placed in series with the thermistor.

What constitutes the self-heat region for a given thermistor is determined not only by voltage and current but also by the environment in which the unit is placed, the temperature of surrounding medium, whether the medium is moving or still and of what the medium consists (helium, oxygen, air etc.). Therefore, it is possible to select the value of power supply 80 and of resistors $R_1$, $R_2$ and $R_3$ so that the thermistors operate totally in the nonself-heat region, whether they are supplied with cooling air or not, or totally in the self-heat region. A third alternate and that which is chosen is to have a blower-cooled thermistor operate below the self-heat region while a nonblower-cooled thermistor operates slightly in the self-heat region. While all approaches will work, the latter one provides somewhat faster switching than the first two, as will be described shortly.

The terminal 53 between thermistor $T_1$ and resistor $R_1$ is connected to one input terminal of an operational amplifier such as a comparator amplifier 82. The terminal 55 between thermistor $T_2$ and resistor $R_2$ is connected to a second input terminal of amplifier 82. The voltages $V_1$ and $V_2$ develop at terminals 53 and 55, respectively. Amplifier 82 drives a power amplifier 84, and the latter is coupled to solenoid 44.

Amplifier 82 is of conventional design. In response to an input voltage difference of greater than a given value in one sense ($V_1 > V_2$), it produces an output signal representing the binary digit bit 1; in response to a voltage difference of greater than a given value in the opposite sense ($V_2 > V_1$), it produces an output signal representing the bit 0. Resistor $R_1$ may be selected to be lower in value than $R_2$ while thermistors $T_1$ and $T_2$ may be rather closely matched in resistance in the range of temperatures and currents employed. Therefore, when $T_1$ and $T_2$ are cooled equally, $V_1$ will be lower than $V_2$. The change in the resistance of $T_1$ with loss of cooling and the change in the other elements of the system will now be described.

In operation, direct voltage 80 provides power to heat thermistors $T_1$ and $T_2$. Assume that the ribbon 12 is in the dotted line position in FIG. 1 so that both thermistors are cooled equally and stabilize at the same temperature. Since resistor $R_2$ has a higher impedance than $R_1$ and since the thermistors are at substantially the same temperature and have substantially equal resistances at the same temperature, voltage $V_2$ is greater than voltage $V_1$.

So long as $V_2$ is greater than $V_1$ by some minimal amount (to avoid ambiguity in amplifier 82), amplifier 84 may be adjusted such that no power is received by solenoid 44. When solenoid 44 is de-energized, spring 42 will tend to pull the skew mechanism 34 to the left (as illustrated in FIG. 1). Therefore, as web 12 is driven onto take-up spool 16, it will also move to the left, eventually blocking the flow of cooling air to thermistor $T_1$. This causes the thermistor $T_1$ to get hotter. When the temperature of a thermistor increases, its resistance decreases. This causes the current $I_1$ to increase resulting in an increase in voltage $V_1$.

As the resistance of bridge branch $R_1$, $T_1$ decreases, the current in that branch increases and the resistance from node 51 through the bridge, to ground, decreases which decreases the resistance of the entire parallel combination. Since the resistor $R_3$ is materially larger in value than the resistance of the bridge looking from terminal 51 to ground, the changes in the bridge impedance do not substantially affect the current $I_t$ flowing through resistor $R_3$. Accordingly, when $I_1$ increases, $I_2$ decreases by approximately the same amount. A reduction in current $I_2$ causes a proportional power dissipation reduction in $T_2$ and hence lowers its temperature. Therefore, the resistance of $T_2$ increases and this even further decreases $I_2$. The decrease in current $I_2$ results in an increase in current $I_1$ which causes $T_1$ to get hotter and therefore to decrease further in resistance. Thus, the presence of resistor $R_3$ results in a cumulative set of actions which cause the bridge to quickly change from the state in which $V_2 > V_1$ to a second state in which $V_1 > V_2$. This effect may be termed positive or regenerative feedback.

When $V_1$ becomes greater than $V_2$, the output of amplifier 82 and of amplifier 84 is such that power is supplied to solenoid 44, energizing it. When solenoid 44 is energized, skew correction mechanism 34, FIG. 1, moves to the right urging the web 12 to the right until temperature sensing mechanism 52 is once again exposed to the flow of cooling air. When this occurs, the two temperature sensing mechanisms will be cooled equally and $V_2$ will become greater than $V_1$. Again, the feedback action via common resistor $R_3$ greatly speeds up the return of the bridge circuit to its initial state in which $V_2 > V_1$. When $V_2$ becomes greater than $V_1$, the amplifiers 82 and 84 produce insufficient output current to drive solenoid 44 and the latter becomes de-energized. The cycling described thereafter repeats.

While the circuit has been described in terms of a thermistor having an inverse relationship between temperature and resistance, any temperature sensing device having a resistance which varies either directly or inversely as a function of temperature will be suitable as a temperature sensing means. Further, although the device as described is used in connection with a high-speed printer, any application involving a moving web or other workpiece of any sort which may vary from a desired path would be a suitable substitute.

In one operative embodiment, the following components were employed:

| | |
|---|---|
| Thermistors $T_1$, $T_2$ | Fenwall Electronics G126 |
| Resistor $R_1$ | 162 Ω |

| | |
|---|---|
| Resistor R₂ | 196 Ω |
| Resistor R₃ | 3.16K Ω |
| Amplifier 82 | RCA Corp. CA 3033 high-gain operational amplifier |
| Power Supply 80 | 12 volts |

What is claimed is:

1. Apparatus for controlling the position of an object comprising, in combination:

first and second temperature sensing devices, each having a parameter the value of which is indicative of the temperature sensed by said device;

cooling means directing a cooling medium at said devices for substantially equally cooling both devices;

an object;

means for moving said object between said cooling means and said first device thereby causing the first device's temperature to increase and the value of its temperature sensitive parameter to change; and means responsive to the corresponding change in the difference in values between said parameter of said first device and said parameter of said second device for moving said object away from the space between said cooling means and said first device.

2. Apparatus for controlling the position of a movable workpiece comprising, in combination:

a pair of temperature sensing elements;

means for heating said elements;

means opposite said elements for directing a fluid toward said elements for normally maintaining a given temperature relationship between them, the distance between at least one of said elements and said fluid directing means being sufficiently large to permit at least a portion of said movable workpiece to be interposed therebetween to impede the fluid flow to said element whereby its temperature is altered; and means responsive to the change in said given temperature relationship between said elements caused by said workpiece impeding the flow of fluid to said one element for moving said workpiece away from the interposed position.

3. The combination as set forth in claim 2 wherein said pair of temperature sensing elements comprise thermistors each having a resistance which changes as a function of temperature sensed by said element.

4. The combination as set forth in claim 2 wherein said workpiece comprises an elongated web movable in a direction normal to the direction of its length dimension, and wherein said pair of heatable elements are adjacent to and on one side of said web and beyond one edge of said web with one element further from said edge than the other, and further including means to move said web so that a portion near said one edge impedes the flow of fluid to said temperature sensing element nearer said edge.

5. The combination as set forth in claim 4 wherein said means for supplying said fluid comprises an air supply means opposite said elements on the other side of said web for blowing a stream of air at a temperature lower than the temperature of said elements in the absence of said air stream, on both elements for cooling them.

6. The combination as set forth in claim 5 wherein said temperature sensing elements comprise thermistors, each having a resistance which changes as a function of temperature sensed by said elements, and wherein said means for heating said elements comprises a means for supplying sufficient electrical current to said elements to place them in the self-heat region.

7. An arrangement for guiding a moving web in a direction laterally of the direction of web movement comprising, in combination:

a pair of heatable elements, both located on the same side of the web, both located beyond an edge of the web and one spaced slightly further from said edge than the other;

means supplying heating current to said elements;

air supply means opposite said elements, on the other side of said web, for blowing a stream of air at both elements for normally maintaining a given temperature relationship between said elements;

means continuously urging said web in a direction laterally of the direction of web movement and toward said elements, whereby after a given interval of time, said web moves between the closest one of said elements and said air supply means impeding said stream of air to said one element and thereby causing the temperature of said one element to change; and means responsive to a change in said given temperature relationship between said elements for urging said web in the opposite direction laterally of the direction of web movement.

8. An arrangement for guiding a moving web in a direction laterally of the direction of web movement comprising, in combination:

a pair of thermistors both located on the same side of the web, both located beyond an edge of the web, one slightly further from the web than the other, each thermistor having a resistance which varies as a function of its temperature;

means for supplying heat to said thermistors;

air supply means opposite said elements, on the other side of said web, for blowing a stream of air at a temperature lower than the normal ambient temperature of said thermistors, at both elements for normally maintaining a given temperature relationship between said elements;

means continuously urging said web in a direction laterally of the direction of web movement and toward said elements, whereby after a given interval of time, said web moves between the closer one of said elements and said air supply means impeding said stream of air to that element and thereby causing its temperature to rise; and means responsive to the change in resistance of said closer element relative to that of the other element due to the change in temperature of said closer element for urging said web in the opposite direction laterally of the direction of web movement to a position such that said air flow impediment is removed.

9. In combination:

two temperature sensing elements, each having a parameter the value of which varies with temperature;

means directing a cooling fluid at both elements for establishing a given temperature relationship therebetween;

an object normally moving along a path close to the space between one element and the means directing cooling fluid at that element and capable of moving slightly out of its normal path and into said space, thereby at least partially blocking said cooling fluid; and means responsive to the resulting change in said given temperature relationship for returning said object to its normal path of movement.

10. In the combination as set forth in claim 9, said object comprising an elongated web.

11. In the combination as set forth in claim 9, said two temperature sensing elements comprising thermistors, further including means supplying current to both thermistors.

12. In the combination as set forth in claim 11, said means responsive to the resulting change in said given temperature relationship comprising means for sensing the voltage across said thermistors.

* * * * *